United States Patent
Lin et al.

(10) Patent No.: US 10,514,663 B2
(45) Date of Patent: Dec. 24, 2019

(54) MICROGRID SYSTEM AND CONTROLLER

(71) Applicant: United Technologies Corporation, Farmington, CT (US)

(72) Inventors: Yiqing Lin, Glastonbury, CT (US); Stella M. Oggianu, West Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 62 days.

(21) Appl. No.: 15/579,990

(22) PCT Filed: Jun. 12, 2015

(86) PCT No.: PCT/US2015/035497
§ 371 (c)(1),
(2) Date: Dec. 6, 2017

(87) PCT Pub. No.: WO2016/200398
PCT Pub. Date: Dec. 15, 2016

(65) Prior Publication Data
US 2018/0173171 A1    Jun. 21, 2018

(51) Int. Cl.
*G05D 3/12* (2006.01)
*G05D 5/00* (2006.01)
(Continued)

(52) U.S. Cl.
CPC ............. *G05B 13/021* (2013.01); *G06F 1/30* (2013.01); *G06Q 50/06* (2013.01); *H02J 3/06* (2013.01);
(Continued)

(58) Field of Classification Search
CPC ... G06F 1/30; G06Q 50/06; H02J 3/06; Y02E 40/72; Y04S 10/12
(Continued)

(56) References Cited

U.S. PATENT DOCUMENTS

2008/0046387 A1    2/2008  Gopal et al.
2011/0172835 A1*   7/2011  Imes ................. G06Q 50/06
                                              700/287
(Continued)

FOREIGN PATENT DOCUMENTS

WO    2002054561    7/2002

OTHER PUBLICATIONS

Supplementary European Search Report for European Patent Application No. 15895114 completed Jan. 17, 2019.
(Continued)

*Primary Examiner* — Md Azad
(74) *Attorney, Agent, or Firm* — Carlson, Gaskey & Olds, P.C.

(57) ABSTRACT

A microgrid controller includes a database in communication with a processor. The processor is operable to receive at least one microgrid input, to determine a first plurality of optimal power characteristic levels at a corresponding one of a plurality of first time intervals for a first time period, and to determine a second plurality of optimal power characteristic levels of a device determined at a corresponding one of a plurality of second time intervals for a second time period. The first time intervals are found at a first frequency different than a second frequency of the second time intervals. One of the second plurality of optimal power characteristic level corresponds to one of the first plurality of optimal power characteristic levels at each first time interval. The processor is configured to control a device optimal power characteristic level in response to the second plurality of optimal power characteristic levels.

22 Claims, 2 Drawing Sheets

(51) Int. Cl.
  *G05D 17/00* (2006.01)
  *G05D 9/00* (2006.01)
  *G05D 11/00* (2006.01)
  *G05B 13/02* (2006.01)
  *H02J 3/38* (2006.01)
  *H02J 13/00* (2006.01)
  *G06F 1/30* (2006.01)
  *G06Q 50/06* (2012.01)
  *H02J 3/06* (2006.01)
  *H02J 3/00* (2006.01)

(52) U.S. Cl.
  CPC .......... *H02J 3/381* (2013.01); *H02J 13/0006* (2013.01); *H02J 2003/003* (2013.01); *Y02E 40/72* (2013.01); *Y04S 10/12* (2013.01)

(58) Field of Classification Search
  USPC ........................................................ 700/297
  See application file for complete search history.

(56) References Cited

U.S. PATENT DOCUMENTS

| | | | |
|---|---|---|---|
| 2011/0231028 A1* | 9/2011 | Ozog | G06Q 10/06 700/291 |
| 2013/0041516 A1 | 2/2013 | Rockenfeller et al. | |
| 2013/0190938 A1 | 7/2013 | Zadeh et al. | |
| 2015/0039145 A1 | 2/2015 | Yang et al. | |
| 2015/0094968 A1* | 4/2015 | Jia | G06Q 40/04 702/60 |
| 2015/0241893 A1* | 8/2015 | Hajimiragha | G05F 1/66 700/297 |
| 2017/0176965 A1* | 6/2017 | Martin Lloret | G06Q 10/06 |

OTHER PUBLICATIONS

International Search Report for International Application No. PCT/US2015/035497 completed Sep. 15, 2015.
International Preliminary Report on Patentability for International Application PCT/US2015/035497 dated Dec. 21, 2017.

* cited by examiner

MICROGRID SYSTEM AND CONTROLLER

STATEMENT REGARDING FEDERALLY SPONSORED RESEARCH OR DEVELOPMENT

This invention was made with government support under Contract No. DE-EE0003954, awarded by the Department of Energy. The Government has certain rights in this invention.

BACKGROUND

This disclosure relates to power generation and consumption and, more particularly, to controlling microgrid thermal and/or electrical power supply, storage and consumption.

A controller associated with a microgrid can account for power consumption during different time periods. The controller may need to account for power consumption during a longer time period due to the periodic patterns associated with a load, with the capacity associated with generators and storage devices, and with utility rates. The controller may also need to account for power consumption during a shorter time period to respond to the faster power dynamics of certain devices, such as solar photovoltaic or wind turbines. As a result, the controller addresses and adjusts both discrete and nonlinear system constraints over a different time periods, including time periods with a number of relatively short time intervals. Simplified models used in these circumstances can result in a less accurate and less efficient microgrid model.

SUMMARY OF THE DISCLOSURE

In a featured embodiment, a microgrid controller includes a database configured to retain information from a device and a processor in communication with the database. The processor is operable to receive at least one microgrid input and to determine a first plurality of optimal power characteristic levels corresponding to a microgrid in response to the at least one microgrid input. Each of the first plurality of optimal power characteristic levels is determined at a corresponding one of a plurality of first time intervals for a first time period. The processor is operable to determine a second plurality of optimal power characteristic levels of a device in response to the at least one microgrid input. Each of the second plurality of optimal power characteristic levels is determined at a corresponding one of a plurality of second time intervals for a second time period. The plurality of first time intervals is found at a first frequency different than a second frequency of the plurality of second time intervals. The first time period is different than the second time period. One of the second plurality of optimal power characteristic level corresponds to one of the first plurality of optimal power characteristic levels at each of the plurality of first time intervals. The processor is configured to control the optimal power characteristic level of the device in response to at least one of the second plurality of optimal power characteristic levels.

In another embodiment according to the previous embodiment, the device is one of an energy storage device or a generator.

In another embodiment according to any of the previous embodiments, the first frequency is greater than the second frequency.

In another embodiment according to any of the previous embodiments, the first frequency is between ten minutes and fifteen minutes and the second frequency is between 120 seconds and 180 seconds.

In another embodiment according to any of the previous embodiments, the at least one microgrid input is a load forecast corresponding to the device.

In another embodiment according to any of the previous embodiments, the at least one microgrid input is a utility cost associated with the device.

In another embodiment according to any of the previous embodiments, only an earliest of the second plurality of optimal power characteristic levels is communicated to the device.

In another featured embodiment, a system for power distribution includes a main electric grid in communication with a power source, a microgrid in communication with the main electric grid that includes a controller comprising a processor, and a device operable to communicate with the controller. The processor is operable to determine an optimal power characteristic level of the device and to receive at least one microgrid input. The processor is operable to determine a first plurality of optimal power characteristic levels corresponding to the microgrid in response to the at least one microgrid input. Each of the first plurality of optimal power characteristic levels is determined at a corresponding one of a plurality of first time intervals for a first time period. The processor is operable to determine a second plurality of optimal power characteristic levels of the device in response to the at least one microgrid input. Each of the second plurality of optimal power characteristic levels is determined at a corresponding one of a plurality of second time intervals for a second time period. The plurality of first time intervals is found at a first frequency different than a second frequency of the plurality of second time intervals. The first time period is different than the second time period. One of the second plurality of optimal power characteristic level corresponds to one of the first plurality of optimal power characteristic levels at each of the plurality of first time intervals. The processor controls the optimal power characteristic level of the device in response to at least one of the second plurality of optimal power characteristic levels.

In another embodiment according to the previous embodiment, the controller includes a forecast module operable to communicate the at least one microgrid input to the processor. The at least one microgrid input is a load forecast for the device.

In another embodiment according to any of the previous embodiments, the controller includes a server operable to provide the at least one microgrid input to the processor. The at least one microgrid input is real time utility cost for the device.

In another embodiment according to any of the previous embodiments, the controller is operable to communicate only an earliest of the second plurality of optimal power characteristic levels to the device.

In another embodiment according to any of the previous embodiments, the at least one microgrid input is a status of the device. The device communicates the status to the controller and is operable to receive the optimal power characteristic level from the controller.

In another embodiment according to any of the previous embodiments, at least one of the second plurality of optimal power characteristic levels is less than at least one of the first plurality of optimal power characteristic levels.

In another featured embodiment, a method of power distribution for a power grid includes operating a device having a power characteristic level. At least one input is provided to a microgrid controller. A first plurality of optimal power characteristic levels corresponding to a microgrid are determined using the microgrid controller in response to the at least one input. Each of the first plurality of optimal power characteristic levels is determined at a corresponding one of a plurality of first time intervals for a first time period. A second plurality of optimal power characteristic levels of the device are determined using the microgrid controller in response to the at least one input of the microgrid controller. Each of the second plurality of optimal power characteristic levels is determined at a corresponding one of a plurality of second time intervals for a second time period. The plurality of first time intervals is found at a first frequency different than a second frequency of the plurality of second time intervals. The first time period is different than the second time period. One of the second plurality of optimal power characteristic level corresponds to one of the first plurality of optimal power characteristic levels at each of the plurality of first time intervals. An earliest one of the second plurality of optimal power characteristic levels is communicated to the device. The optimal power characteristic level of the device is changed to match the earliest one of the second plurality of optimal power characteristic levels in response to a command from the microgrid controller.

In another embodiment according to the previous embodiment, only the earliest one of the second plurality of optimal power characteristic levels is communicated to the device.

In another embodiment according to any of the previous embodiments, a load forecast of the device is determined using a forecast module, wherein the at least one input is the load forecast.

In another embodiment according to any of the previous embodiments, a real time utility cost of the device is determined using a server, wherein the at least one input is the real time utility cost.

In another embodiment according to any of the previous embodiments, the first frequency is fifteen minutes and the second frequency is ninety seconds.

In another embodiment according to any of the previous embodiments, a status of the device is communicated to the microgrid controller.

In another embodiment according to any of the previous embodiments, the device is a battery or a generator assembly.

BRIEF DESCRIPTION OF THE DRAWINGS

The various features and advantages of disclosed embodiments will become apparent to those skilled in the art from the following detailed description. The drawings that accompany the detailed description can be briefly described as follows.

DETAILED DESCRIPTION

Microgrids within an electrical grid or a thermal grid employ systems and controls to monitor and control power distribution. Microgrids may include both discrete and non-linear constraints that can necessitate consideration of power distribution over both a long time period and a short time period. This disclosure provides a system that manages a microgrid by utilizing a controller that provides two-layer predictive control architecture with stochastic programming and nonlinear programming.

Figure 1:
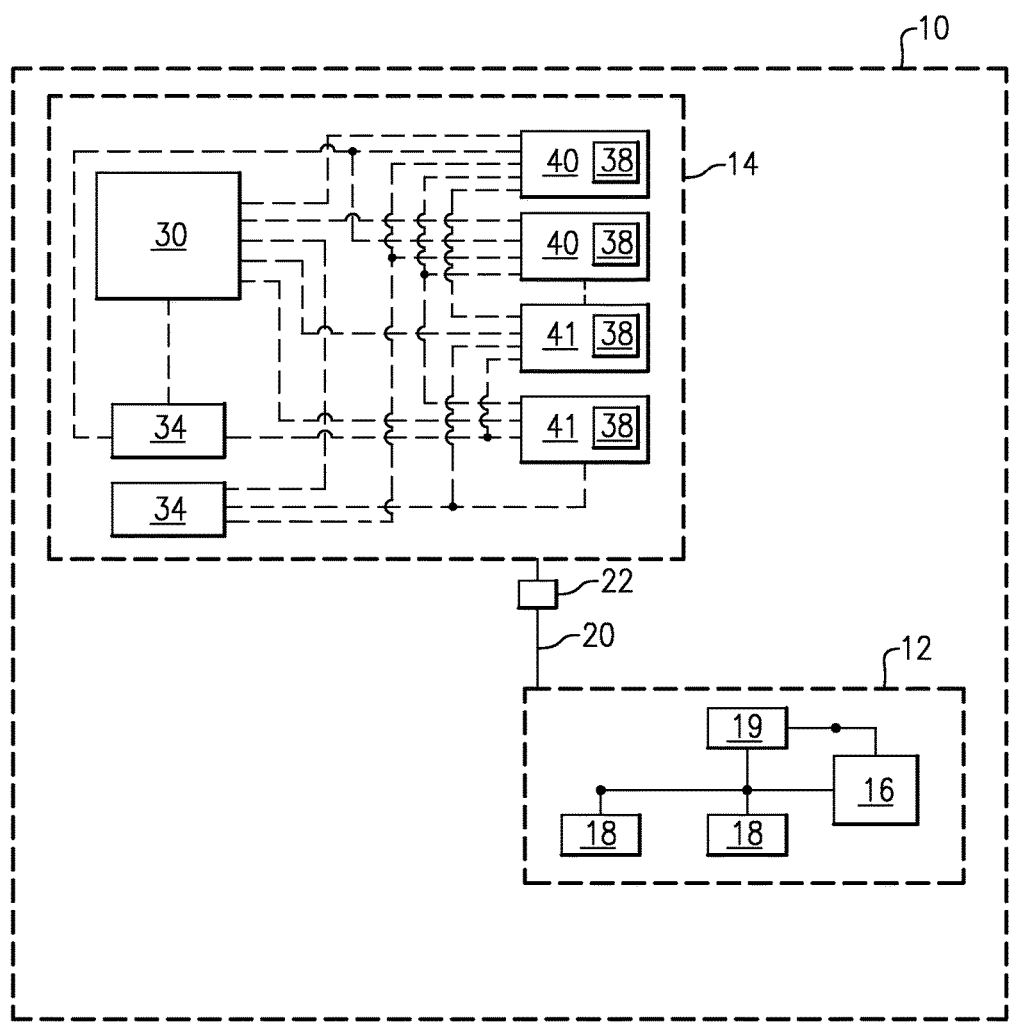
FIG. 1 schematically shows an example electrical grid.

In this regard, FIG. 1 schematically illustrates an example electrical grid 10 including a main grid 12 electrically connected to a microgrid 14. The main grid 12 has an external power source 16, provided by a main or utility power service, for example. In one example, the external power source 16 is a hydroelectric, gas, coal, steam, or nuclear power generation source, although other power sources are contemplated in this disclosure. The main grid 12 has one or more associated external loads 18. External loads 18 may be a variety of different power consumption devices such as household, industrial and commercial electrical devices depending on the location and arrangement of the main grid 12. Other loads can also be coupled to the electrical grid 10, such as heating, ventilating, and air conditioning ("HVAC") units. In one example, the external load 18 is a thermal load including fluid cooling and heating systems. The main grid 12 has one or more associated external storage devices 19, such as thermal storage tanks, although other external storage devices are contemplated in this disclosure.

The microgrid 14 is electrically coupled to the main grid 12 via an electrical bus 20. The microgrid 14 includes a microgrid controller 30 in communication microgrid device such as one or more microgrid load devices 34, one or more microgrid power sources 40, and one or more microgrid storage devices 41. In some examples, the microgrid 14 is coupled to other power distribution networks such as gas or water systems.

In one example, the microgrid load devices 34 include household, commercial, and/or industrial equipment or devices associated with the microgrid 14. Microgrid load devices 34 may also include processors, computers, external media, batteries, regenerator elevators, or other devices requiring or providing power. In one example, the microgrid load devices 34 are situated in one or more buildings or campuses. In another example, microgrid load devices 34 are situated in a single apartment.

In one example, the electrical bus 20 is electrically coupled to the main grid 12 by a switch 22, such as a circuit breaker. However, other switches 22 and connections are contemplated. The switch 22 is operable to selectively disconnect or electrically isolate the microgrid 14 from the main grid 12.

Microgrid load devices 34 each include a corresponding power level, device status, and are operated in response to commands from microgrid controller 30. The microgrid load device 34 communicates with microgrid controller 30 to provide microgrid load device 34 data, or inputs, to the microgrid controller 30, as will be described in further detail below. Microgrid load devices 34 may also include other power storage devices 41 discussed in this disclosure when the other power storage devices 41 are regenerative, act as loads, and require power from main grid 12 or microgrid 14.

The microgrid 14 includes a power source. The power source may include at least one microgrid power source 40 such as a generator, and the main power grid 12. Microgrid power source 40 may include thermal power sources, such as boilers, steam generators, or other thermal power sources as well as renewable power sources, such as solar panels. Microgrid power source 40 may also include other power storage devices 41 discussed in this disclosure when the other power storage devices 41 provide power to the main grid 12 or microgrid 14.

The microgrid power source 40 is operable to provide power for consumption by the microgrid load devices 34. The microgrid power source 40 may also provide power back to the main grid 12 to power the external loads 18. In one example, the microgrid power source 40 includes a mechanical power generation device such as a combustion engine mechanically coupled to an electrical generator. Other generator assembly 40 devices are contemplated by this disclosure, including wind turbines, hydro turbines, fuel cells, diesel generators, and any of the power storage devices discussed in this disclosure.

Microgrid power sources 40 each include a corresponding local controller 38 that controls power levels, device status, and operation of the associated microgrid power source 40 in response to commands from microgrid controller 30. Local controller 38 communicates with microgrid controller 30 to provide microgrid power source 40 data, or inputs, to the microgrid controller 30. In one example, the local controller 38 communicates with the microgrid controller 30 to determine an on/off decision of the microgrid power source 40 or to determine a power level of the microgrid power source 40 or the microgrid load device 34.

The microgrid 14 includes at least one microgrid storage device 41 such as a battery or supercapacitor. Microgrid storage device 41 may also include other power storage devices discussed in this disclosure including, but not limited to, thermal energy microgrid storage devices 41 such as storage tanks, hot water tanks, or other thermal storage devices.

The microgrid storage device 41 is operable to store power from the microgrid source 40 or from the main grid 12 for consumption by the microgrid load devices 34 or to provide power to the main grid 12. Microgrid storage device 41 each include a corresponding local controller 38 that controls storage levels, device status, and operation of the associated microgrid storage device 41 in response to commands from microgrid controller 30. Local controller 38 communicates with microgrid controller 30 to provide microgrid storage device 41 data, or inputs, to the microgrid controller 30. In one example, the local controller 38 communicates with the microgrid controller 30 to determine an on/off decision of the microgrid storage device 41 or to determine a charge/discharge schedule of the microgrid storage device 41.

Figure 2:
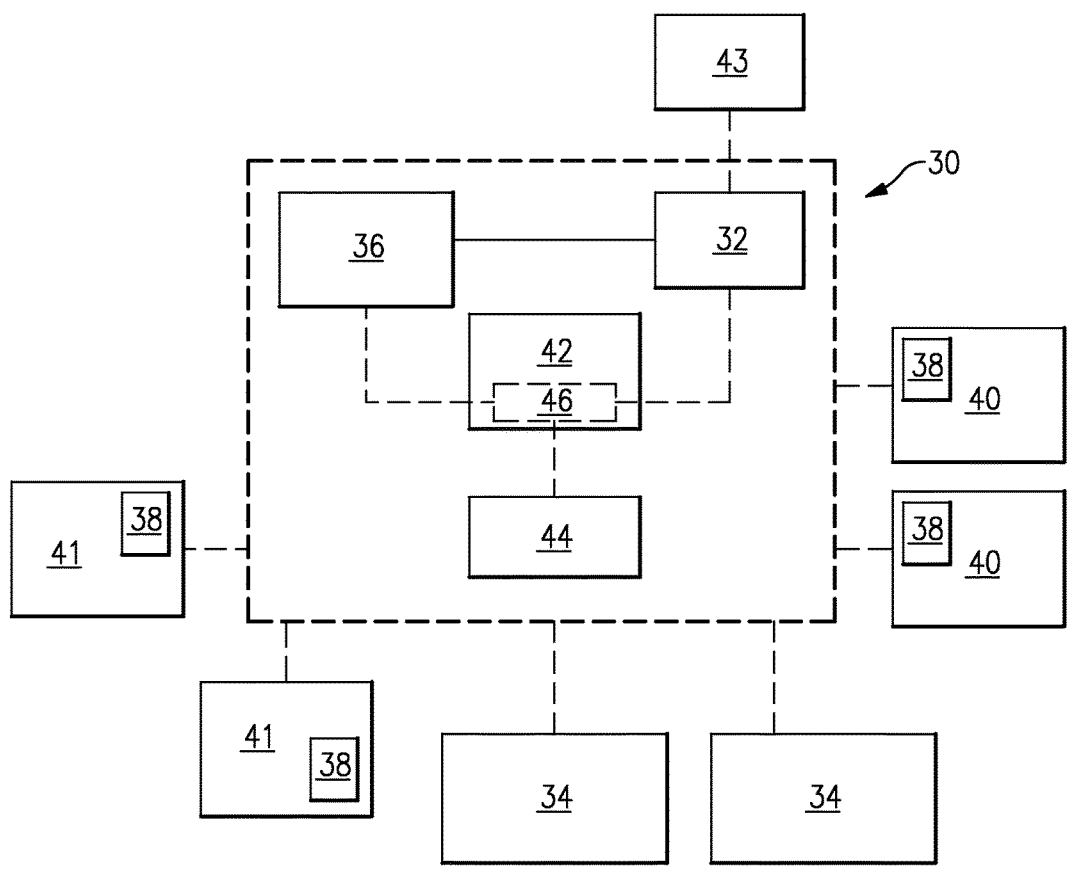
FIG. 2 schematically shows an example microgrid controller and microgrid load device.

Referring to FIG. 2, with continued reference to FIG. 1, an example microgrid controller 30, in communication with a microgrid load device 34, includes a server 32, a forecast module 36, a processor 42 having an optimization engine 46, and a database 44. Other components of the microgrid controller 30 are contemplated, including for example communication modules, memory, and other components desirable in response to the specific structure and arrangement of the microgrid 14.

The processor 42 includes the optimization engine 46 to determine a power characteristic level for each particular microgrid load device 34, microgrid power source 40, and microgrid storage device 41 as will be described in further detail below. The power characteristics include, but are not limited to, voltage level, current level, microgrid load device 34 status (e.g. on/off, operational mode, etc.), microgrid power storage device 41 status (e.g. on/off, operational mode, etc.) or other characteristic associated with any of the microgrid load device 34, microgrid power source 40, and microgrid storage device 41. The optimization engine 46 communicates with the server 32, the forecast module 36, and the database 44 to obtain a number of inputs.

The optimization engine 46 determines an optimal power characteristic level of one or more microgrid load devices 34, microgrid power sources 40, and microgrid storage devices 41 in response to the obtained inputs. The inputs include, but are not limited to, utility price, supply forecast, load forecast, load shed request, real time device status, replacement and maintenance cost, initial device cost, device operating features, device operating constraints, environmental constraints, and customer preferences. The inputs may be associated with the microgrid 14 and/or one or more specific microgrid load devices 34, microgrid power sources 40, or microgrid storage devices 41. It is understood that any number of these inputs, alone, in combination with each other, or in combination with other contemplated inputs, may be utilized.

The server 32 communicates certain inputs to the optimization engine 46. In one example, the server 32 is communicates via internet, Bluetooth, wired communication, or other non-wireless communication protocol with an information source 43. The information source 43 may provide current utility prices, current weather information, weather predictions, or other external information to the server 32.

In one example, the server 32 communicates a real time utility price associated with a particular power characteristic of one or more microgrid load devices 34 to the optimization engine 46. In this manner, the optimization engine 46 is able to use the real time utility price as a parameter for determining the microgrid load device 34, microgrid power source 40, and microgrid storage device 41 optimal power characteristic level. For example, the real time utility price may be the associated cost of using the battery and the associated cost to charge a battery within a certain timeframe. The optimization engine 46 can then use this real time utility price to compare to other utility prices to determine the optimal power characteristic level.

In another example, the server 32 provides a load shed request to the optimization engine 46. A load shed request is a request to turn off, or cut off, a particular microgrid load device 34 in response to a failure or overload. The optimization engine 46 can incorporate a load shed request communicated by the server 32 and determine that one microgrid load device 34, microgrid power source 40, and microgrid storage device 41 needs to be taken offline, while also adjusting other microgrid load device 34 depending on the optimal power characteristic levels and the efficiency goals of the microgrid 14.

In one example, the server 32 is a utility web server that communicates with the optimization engine 46 wirelessly via Bluetooth, internet, or other wireless communication protocol. Other example servers 32 may communicate with optimization engine 46 via LAN, wired communication, or other non-wireless communication protocol.

The forecast module 36 communicates certain inputs to the optimization engine 46. In one example, the forecast module 36 communicates to the optimization engine 46 the load forecast for a particular portion of the microgrid 14. The load forecast includes, but is not limited to, expected power usage and requirements over a particular time frame and expected changes in status (i.e. shut down, heavy usage, etc.). The forecast module 36 is operable to communicate a load forecast for an individual microgrid load device 34, as well as the entire microgrid 14, or a portion thereof.

In one example, the forecast module 36 may provide a load forecast corresponding to microgrid load device 34 such as an appliance, such as a refrigerator, toaster, microwave, or oven, within an apartment building. In another example, the microgrid 14 corresponds to the apartment building and the forecast module 36 provides a load forecast for a microgrid load device 34 comprising the entire apartment building, one floor of the apartment building, or certain apartments within the apartment building. In this manner, the forecast module 36 provides the optimization engine 46 the load forecast for any portion of the microgrid 14 or any particular microgrid load device 34, or group thereof.

In another example, the forecast module 36 provides the forecast of various microgrid load devices 34 of a commercial or industrial building, such as usage of an HVAC system or an elevator. The optimization engine 46 uses the provided load forecast to determine the optimal power characteristic level of each microgrid load device 34. In another example, the forecast module 36 also provides a load forecast of microgrid power sources 40 including at least one of solar radiation, wind speed, or another renewable power source.

In one example, the forecast module 36 communicates certain inputs to the optimization engine 46 including a supply forecast for a particular portion of the microgrid 14. The supply forecast includes, but is not limited to, expected power storage over a particular time frame for solar or wind based power. The forecast module 36 is operable to communicate a supply forecast for an individual microgrid storage device 41, as well as the entire microgrid 14, or a portion thereof.

The forecast module 36 provides the optimization engine 46 data regarding future load profiles of the microgrid 14 and the microgrid load devices 34, microgrid power sources 40, and microgrid storage devices 41.

In one example, the optimization engine 46 uses a sample average approximation approach. In this approach, the optimization engine 46 optimizes data from the forecast module 36 over multiple sets of future load profiles, and attempts to compute optimal power characteristic levels at particular intervals that are feasible for all given future load profiles. The optimization engine 46 minimizes the mean objective values of the future load profiles.

In one example, the optimization engine 46 uses the following parameters and equation to determine the optimal power characteristic levels:

$$(P^{buy,s}(s=1, 2, \ldots, N_s), P^{sell}, P^{diesel}, P^{batt}) = \arg\min\left(\frac{1}{N_s}\sum_{s=1}^{N_s} C(L_s)\right)$$

$$\text{s.t. } g(P^{buy,s}, P^{sell}, P^{diesel}, P^{batt}) = 0, \text{ for } s = 1, 2, \ldots, N_s.$$

where $N_s$ is the number of load profiles $L_s$ is load scenarios $C(L_s)$ is the objective function for load scenarios $P^{buy,s}$ is the power purchased from electrical grid 10, and the values are scenario—dependent $P^{sell}$, $P^{diesel}$, $P^{batt}$ are power characteristics for particular microgrid load devices 34, in this example for a grid sell, a diesel generator and a battery.

$g(P^{buy,s}, P^{sell}, P^{dielel}, P^{batt})$ is the model constraints on microgrid load devices 34 dynamics and load constraints.

In one example, the microgrid 14 is a building, such as an apartment building or commercial building. In this example, the optimization engine 46 accounts for a load forecast input for the building provided by the forecast module 36. The forecast module 36 determines a load forecast in response to an available weather forecast. The forecast module 36 utilizes the following parameters and equation to predict the load forecast that is communicated to the optimization engine 46:

$$y_t = \alpha_0 + \sum_{k=1}^{p} \alpha_k \cdot x_{tk}$$

where $y_t$: output variable for time t $\alpha_0$: a constant term $\alpha_k$, k=1, ..., p: weight for each input variable $x_{tk}$, k=1, ..., p: value of input variable k at time t In this example, the input variables include, but are not limited to, dry bulb temperature, horizontal total radiance, horizontal scatter radiance, dampness, and air pressure. Other input variables are contemplated in this disclosure.

In one example, the microgrid load device 34 is an elevator. In this example, the optimization engine 46 accounts for a load forecast input for the elevator provided by the forecast module 36. The forecast module 36 determines a load forecast in response to a historical profile of the current load collected from the elevator. The forecast module 36 utilizes the following parameters and equation to predict a load forecast that is communicated to the optimization engine 46:

$$e_{t+k} = \frac{e_t}{h_t} \cdot h_{t+k}, \text{ for } k = 1, 2, \ldots, T$$

where $e_{t+k}$, k=1, ..., T: load forecast at time t+k $e_t$: input load at time t $h_{t+k}$, k=1, ..., T: historical load at time t+k $h_t$: historical load at time t The processor 42 with optimization engine 46 communicates with the database 44 to provide an optimal power characteristic level, as will be described in further detail below. The database obtains and stores inputs from the microgrid load devices 34 that are communicated to the optimization engine 46. For example, the database 44 will obtain, from the microgrid load device 34, a real time device status, device operating constraints, and environmental constraints pertinent to the microgrid load device 34 for use by the optimization engine 46. The database 44 stores replacement and maintenance costs for a particular microgrid load device 34, the initial device cost of the microgrid load device 34, the microgrid load device 34 operating features, and customer preferences that relate to the microgrid load device 34 for use by the optimization engine 46. The database 44 also obtains and stores the data and preferences of the microgrid 14, or a sub-portion thereof, for use by the optimization engine 46.

In one example, the database 44 includes UVPROM, EEPROM, FLASH, RAM, ROM, DVD, CD, a hard drive, or other computer readable medium (not shown) which may store data and operation commands.

In another example, the database 44 is optional and the optimization engine 46 sends optimal power characteristic levels directly to any of the microgrid power source 40, the microgrid storage device 41, and the microgrid load device 34 without storing these values.

The microgrid controller 30 communicates with local controller 38 of the microgrid power source 40, the microgrid storage device 41, and the microgrid load device 34, to provide an optimal power characteristic level, as well as receive inputs. The microgrid controller 30 operates the associated microgrid load devices 34, the microgrid power source 40, and the microgrid storage device 41 in accordance with the communicated optimal power characteristic level. The database stores both current and future optimal power characteristic levels for a microgrid load device 34, the microgrid power source 40, and the microgrid storage device 41. These optimal power characteristic levels are provided by the optimization engine 46, and are updated at certain time intervals, as will be described in further detail below. In one example, the microgrid controller 30 communicates only a current, real time, optimal power characteristic level to the microgrid load device 34, the microgrid power source 40, and the microgrid storage device 41. The respective microgrid load device 34, microgrid power source 40, and microgrid storage device 41 then operates according to this communicated optimal power characteristic level.

The optimization engine 46 receives inputs as described herein, and is configured to provide an optimal power characteristic level. In one example, the optimal power characteristic level corresponds to a particular microgrid load device 34. In another example, the optimal power characteristic levels of a number of microgrid load devices 34 are determined and communicated in response to a desired microgrid 14 power distribution. The optimization engine 46 provides the optimal power characteristic levels for each of the microgrid load device 34, the microgrid power source 40, and the microgrid storage device 41 to operate the microgrid 14 in the desired condition for a determined time period. The optimization engine 46 is configured to manage the power characteristic levels of the individual microgrid load devices 34, microgrid power sources 40, and microgrid storage devices 41 to ensure system functionality and emergencies are not compromised, and to ensure microgrid load devices 34, microgrid power source 40, and microgrid storage device 41 are not operating at critical, or unsafe, levels.

In one example, the optimization engine 46 commands the local controllers 38 to use a battery for power instead of other power sources in response to a peak charge time. In this manner, the optimization engine 46 is able to meet the microgrid 14 load demands economically.

Figure 3:
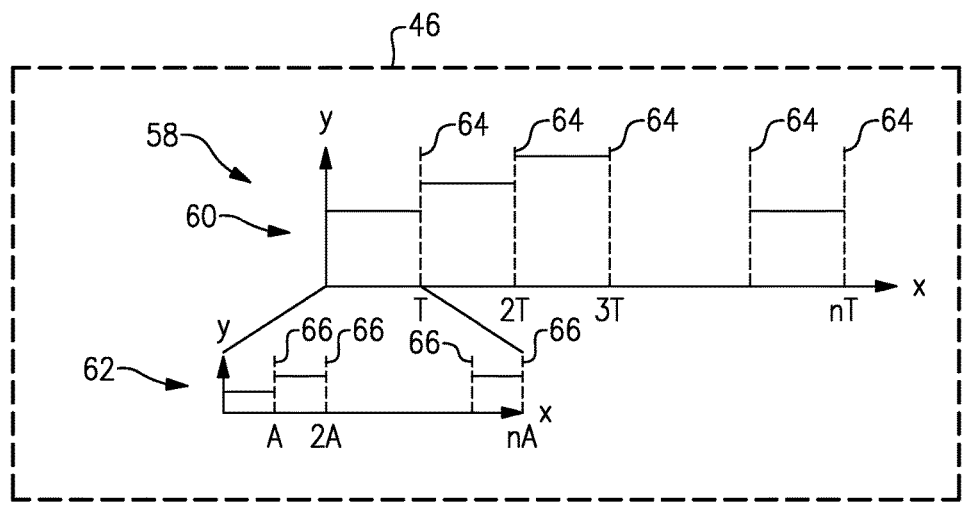
FIG. 3 schematically shows an example optimization engine with a graphically illustrated multi-tier architecture.

Referring to FIG. 3, with continued reference to FIGS. 1 and 2, the optimization engine 46 is configured to effectuate a desired power distribution given a set of inputs. The optimization engine 46 ensures that certain microgrid 14 constraints are met. In one example, microgrid 14 constraints include load balancing and microgrid load device 34 parameters. The load balancing constraint is configured to ensure that the desired load for the microgrid load device 34 is satisfied for any time period by the power generated for the microgrid 14. The parameters of each of the microgrid load device 34, the microgrid power source 40, and the microgrid storage device 41 are configured to employ a mixed set of discrete, linear, and non-linear equations to the dynamics of the respective microgrid load device 34, the microgrid power source 40, and the microgrid storage device 41, in real time, in response to the power generated for the microgrid 14.

The optimization engine 46 employs a multi-layer architecture 58, with each layer focusing on a specified time scale. Before each call to the optimization engine 46, the controller 30 determines the number of inputs that are available to the optimization engine 46.

In this example, the multi-layer architecture 58 includes an example first layer 60 and an example second layer 62. However, the multi-layer architecture 58 may include additional layers. A particular power characteristic level, or setting, is shown on the y-axis, and a time period is shown on the x-axis. The first layer 60 determines optimal levels of the corresponding power characteristic level over a first time period, and at a lower frequency T, than the second layer 62. In one example, the first layer has a time period of twenty-four hours and a frequency T of ten minutes or fifteen minutes. However, other frequencies T and time periods are contemplated. In one example, the first layer 60 determines the optimal power characteristic of all microgrid load devices 34, microgrid power sources 40, or microgrid storage devices 41 of the microgrid 14 and the second layer 62 determines the optimal power characteristic of a particular microgrid load device 34, microgrid power source 40, or microgrid storage device 41.

The optimization engine 46 determines the optimal power characteristic level at a first plurality of intervals 64 of the first time period that correspond to frequency T. That is, each interval 64 is found at each multiple of the frequency T: T, 2T, 3T, . . . NT. In this example NT equals the first time period. Other frequencies and intervals are contemplated in this disclosure. The first layer 60 is configured to coordinate power generation of the microgrid 14, the microgrid load device 34, the microgrid power source 40, and the microgrid storage device 41 to efficiently accommodate load variations over the first time period.

In one example, the first layer 60 determines timing of a battery charge and a battery discharge in response to an input of microgrid load device 34 peak and off-peak patterns over a time period of twenty-four hours.

The second layer 62 determines optimal levels of the corresponding power characteristic level over a second time period, and at a second frequency. The second time period is shorter than the first time period, and the second frequency A is greater than the first frequency T. In one example, the second time period is fifteen minutes and the second frequency A is ninety seconds. In another example, the second time frequency is between 120 seconds and 180 seconds. In another example, the second time frequency is between 1 millisecond and 100 milliseconds. However, other frequencies A and time periods are contemplated. The optimization engine 46 determines the optimal power characteristic level at a second plurality of intervals 66 that correspond to frequency A during the second time period. That is, each interval 66 is found for each multiple of the frequency A: A, 2A, 3A, . . . nA. In this example nA equals the second time period.

The second layer 62 is configured to determine power distribution and generation of at least one of the microgrid load device 34, the microgrid power source 40, and the microgrid storage device 41 over the second time period so as to be consistent with a corresponding first layer 60. Specifically, the power characteristic level generated at the final interval 66 of the second layer 62 corresponds to the power characteristic level generated for the first interval 64 of the first layer 60. That is, the frequency A of the first layer 60 generally corresponds to the time period of the second layer. As used herein, the term corresponds means equal to or relatively close to. For each power characteristic determined in the second layer 62, the optimal power characteristic level is different than or equal to a corresponding optimal power characteristic level in the first layer 60 at a corresponding interval 66 of the second time period. The optimal power characteristic level of the corresponding power characteristic determined in the second layer 62 corresponds to the optimal power characteristic level in the first layer 60 at each of the first plurality of intervals 64. In this manner, the optimization engine 46 conducts long term planning and real time microgrid load device 34 dynamics, microgrid power source 40 dynamics, and microgrid storage device 41 dynamics.

The optimization engine 46 thus employs a multi-layer architecture 58 providing a predictive control. At each of the first plurality of intervals 64 along the x-axis, the optimization engine 46 determines and generates a series of optimal power characteristic levels for the first plurality of intervals 64 at T, 2T, 3T, . . . NT in response to at least one input of the microgrid 14 and the optimal power characteristic of the preceding first interval 64. Similarly, the optimization engine 46 determines and generates a series of optimal power characteristic levels for the second plurality of intervals 66 at A, 2A, 3A, . . . nA, in response to at least one input of the microgrid 14 and the optimal power characteristic level of the preceding second interval 66.

In one example, only the optimal power characteristic level determined at interval 66 A of the first layer 60 is communicated to the database 44 and on to the corresponding microgrid load device 34. After enough time has passed to reach the next interval 66 (i.e. 2A), the optimization engine 46 repeats the process, with the intervals having shifted by one unit corresponding to frequency A. In this manner, the optimization engine 46 incorporates the real time inputs from the microgrid 14 to control power distribution and use in each microgrid load device 34.

In one example, the microgrid storage device 41 is a battery. In this example, the optimization engine 46 desires to plan twenty-four hours ahead in response to a periodic daily pattern of building electricity load and utility prices. The optimization engine 46 in this example provides optimal battery charging and batter discharging levels in response the building load and price patterns. The battery requires the optimization engine 46 to monitor the battery power characteristic levels every two minutes, or frequently enough, to ensure it does not run beyond the safety level without any supervisory input from the optimization engine 46.

In this example, the optimization engine 46 employs the multi-layer architecture 58 to satisfy the microgrid 14 requirements of both fast dynamics of the battery and long-term planning for building load and utility prices. In this example, the first layer 60 uses a time period of twenty-four hours with an frequency T of 15 minutes, whereas the second layer 62 uses a time period of fifteen minutes, with a frequency A of three minutes. The second layer 62 remains consistent with the first layer 60. Specifically, power characteristic level generated at the final interval 66 of the second layer 62, which is fifteen minutes into the future, is equal to the power characteristic level generated for the first interval 64 of the first layer 60.

In one example, the optimization engine 46 employs a non-linear approach to minimize microgrid 14 operating cost. In this example, the optimization engine 46 considers the inputs of utility prices and fuel costs for a generator assembly 40. In this example, the microgrid 14 may be a within building. In this example, the optimization engine 46 determines an optimal power characteristic level in accordance with a number of constraints, as described in further detail below, ensuring all microgrid load devices 34 in the building are satisfied from a combination of energy sources, including the generator assembly 40, as well as microgrid storage device 41.

In this example, the generator assembly 40 is a diesel generator. The optimization engine 46 uses the following parameters and equation to determine the power characteristic level of the generator assembly 40:

$$\text{Fuel}_{diesel} = \alpha \cdot P^{diesel} + \beta \cdot (1 - \exp(-P^{diesel}))$$

where $\text{Fuel}_{diesel}$: fuel consumption for a diesel generator $P^{diesel}$: power level for a diesel generator $\alpha, \beta$: model parameters In one example, the parameters for this equation are taken from the following parameter table:

| Generator Size (kW) | ¼ Load (gal/hr) | ½ Load (gal/hr) | ¾ Load (gal/hr) | Full Load (gal/hr) |
|---|---|---|---|---|
| 20 | 0.6 | 0.9 | 1.3 | 1.6 |
| 30 | 1.3 | 1.8 | 2.4 | 2.9 |

In this example, the optimization engine 46 uses the following parameters and equation to determine the power characteristic level of the battery, which is a microgrid load device 34:

$$Q_0 \frac{d}{dt} SOC(t) = \begin{cases} -I(t) & \text{for } I(t) > 0 \text{ (discharging)} \\ -\eta_c I(t) & \text{for } I(t) < 0 \text{ (charging)} \end{cases}$$

$$V_{cell}(t) = V_O + \frac{K}{1 - SOC(t)} + A \exp[B \cdot SOC(t)] - R_c I(t);$$

$$P^{batt}(t) = N_{cell} \cdot (V_{cell}(t) - R_{cell}(t) \cdot I(t)) \cdot I(t)$$

$$R_{cell}(t) = 4.6 \cdot 10^{-3} \cdot (1 - SOC(t)) + 10^{-4} \cdot (1 - SOC(t))^2$$

$$0.2 \leq SOC(t) \leq 0.8$$

where:
SOC(t) is the state of charge at time t
I(t) is battery current at time t
$P^{batt}(t)$: battery power at time t
$Q_0$ is the nominal battery capacity
$\eta_c$ is charging efficiency
$N_{cell}$ is the number of identical cells in series
$V_{cell}(t)$ is open circuit voltage of a single cell at time t
$V_o$ is a battery constant voltage
$R_{cell}(t)$ is electrical resistance of each cell at time t
$R_C$ is resistance
K, A, B are model parameters In this example, a set of equivalent continuous variables may be used such that the optimization engine 46 uses the following parameters and equation to determine the power characteristic level of the battery:

$$I(t) = I_D(t) - I_C(t), I_D(t), I_C(t) \geq 0, I_D(t) \cdot I_C(t) = 0, \forall t$$

$$Q_0 \frac{d}{dt} SOC(t) = \eta_c I_C(t) - I_D(t)$$

$$P^{batt}(t) = P_D(t) - P_C(t)$$

$$P_D(t) = N_{cell} \cdot (V_{cell}(t) - R_{cell}(t) \cdot I_D(t)) \cdot I_D(t)$$

$$P_C(t) = N_{cell} \cdot (V_{cell}(t) + R_{cell}(t) \cdot I_C(t)) \cdot I_C(t)$$

where in addition to the other notation provided in this disclosure:
$I_D(t)$ is battery discharge current at time t
$I_C(t)$ is battery charge current at time t
$P_D(t)$ is battery discharge power at time t
$P_C(t)$ is battery charge power at time t In one example, the optimization engine 46 considers the constraint of maintaining the microgrid storage device 41, such as the battery, within a safe level of state of charge. In this example, the range of charge is selected to be between 20% and 80%. When the battery is outside of this range of state of charge, the optimization engine 46 can enforce a penalty to make sure the battery is maintained in the optimal range.

In one example, the optimization engine 46 functions to limit utility cost of the microgrid 14. In this example, the optimization engine 46 determines the utility cost in response to a number of energy costs and demand costs, including but not limited to, diesel fuel cost, operation and maintenance cost for a generator assembly as the microgrid power source 40 and a battery, the specific type of battery, the current estimated load that needs to be provided at intervals 64, 66, and the constraints for a battery state of charge range, as described herein. In this example, the optimization engine 46 includes a number of the previously described parameters and equations which are utilized as follows to determine the utility cost:

$$\min \sum_t (c^{util} \cdot P^{buy}(t) + c^{batt,op} \cdot P^{batt}(t) + c^{diesel,fuel} \cdot \text{Fuel}(P^{diesel}(t)) +$$

$$c^{diesel,op} \cdot P^{diesel}(t)) + c^{demand} \cdot \max_t \{P^{buy}(t)\}$$

s.t.

$$P^{batt}(t) = P_D(t) - P_c(t)$$

$$V(t) = V_O + \frac{K}{1 - SOC(t)} + A \cdot \exp(B \cdot SOC(t)) - R_c \cdot I(t)$$

$$V(t+1) = V_O + \frac{K}{1 - SOC(t+1)} + A \cdot \exp(B \cdot SOC(t+1)) - R_c \cdot I(t+1)$$

$$SOC(t+1) = SOC(t) + \frac{\Delta t \cdot (-I_D(t) + \eta_c \cdot I_C(t))}{Q_0}$$

$$P_D(t) = N^{cell} \cdot \frac{I_D(t)}{1000} \cdot \left(\frac{V(t) + V(t+1)}{2} + \frac{I_D(t) \cdot R_B^D(t)}{1000}\right)$$

$$P_C(t) = N^{cell} \cdot \frac{I_C(t)}{1000} \cdot \left(\frac{V(t) + V(t+1)}{2} + \frac{I_C(t) \cdot R_B^C(t)}{1000}\right)$$

$$R_B^C(t) = 4.6 \cdot 10^{-3} \cdot \frac{(1 - SOC(t)) + (1 - SOC(t+1))}{2} +$$

$$10^{-4} \cdot \frac{(1 - SOC(t))^2 + (1 - SOC(t+1))^2}{2}$$

$$R_B^D(t) = 4.6 \cdot 10^{-3} \cdot \frac{(1 - SOC(t)) + (1 - SOC(t+1))}{2} +$$

$$10^{-4} \cdot \frac{(1 - SOC(t))^2 + (1 - SOC(t+1))^2}{2}$$

$$0.2 \leq SOC(t+1) \leq 0.8$$

$$P^{buy}(t) + P^{batt}(t) + P^{diesel}(t) - P^{sell}(t) = \text{Load}^{bldg}(t) + \text{Load}^{elev}(t)$$

where
$c^{util}$ is unit utility cost
$c^{batt,op}$ is battery operation cost
$c^{diesel,fuel}$ is diesel fuel cost
$c^{diesel,op}$ is diesel generator operation cost
$c^{demand}$ is utility cost on maximum demand
$P^{buy}(t)$ is power bought from utility grid at time t
$P^{batt}(t)$ is power generated by battery at time t
$P^{diesel}(t)$ is power generated by diesel generator at time t
$P_D(t)$: battery discharge power at time t
$P_C(t)$: battery charge power at time t
$V(t), V(t+1)$: open circuit voltage at time period t and t+1
$V_O$: a battery constant voltage
K, A, B are model parameters
$SOC(t), SOC(t+1)$: are battery state of charge at time period t and t+1
$R_C$ is resistance
$R_B^C(t)$ is battery resistance during charge cycle at time t
$R_B^D(t)$ is battery resistance during discharge cycle at time t
$I_D(t)$ is battery discharge current at time t
$I_C(t)$ is battery charge current at time t
$Q_0$ is the nominal battery capacity
$\eta_c$ is charging efficiency
$\text{Load}^{bldg}(t)$: building load at time t
$\text{Load}^{elev}(t)$: elevator load at time t The controller 30 uses the optimization engine 46 to employ a variety of microgrid load device 34 parameters in response to microgrid 14 requirements on responding time, cost effective conditions, energy efficient conditions, high power conditions, low power conditions, or other desired microgrid 14 conditions. In one example, the microgrid load device 34 parameters are thermally or electrically based.

In one example, the first layer 60 only incorporates discrete constraints and linear microgrid load device 34 parameters that provide a high-level view of the microgrid 14. In this example, discrete constraints includes, for example, the number of microgrid load device 34 on and off cycles over a first time period of 24 hours. In this example, the second layer 62 may incorporate more detailed, nonlinear equipment parameters and ignore the discrete constraints.

The optimization engine 46 architecture is used to control both the supply and the demand of power in the microgrid 14 over the longer first time period analyzing broader microgrid 14 power characteristics, as well as over the shorter, second time period analyzing more detailed, specific microgrid 14 power characteristics. In this manner, the controller 30 is able to provide efficient power distribution for the microgrid 14 to achieve a desired outcome over a longer time period, while responding efficiently to real time, changing dynamics, constraints, and requests of the microgrid load devices 34.

It is understood that any of the herein described microgrids 14, microgrid load devices 34, equipment, parameters, equations, power characteristics, power characteristic levels, or other described features may be used alone, or in combination in any electrical grid 10. Although certain parameters and equations are described herein, other equations are contemplated and can be utilized. Parameters and equations described as related to certain components are not limited to these components and may be utilized with other components.

Although certain herein described examples have a specific component shown in the illustrations, embodiments of this disclosure are not limited to those particular combinations. It is possible to use some of the components or features from one of the examples in combination with features or components from another one of the examples. It should also be understood that any particular quantities disclosed in the examples herein are provided for illustrative purposes only.

Furthermore, the foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

The invention claimed is:

1. A microgrid controller comprising:
a database configured to retain information from a device of a microgrid;
a processor in communication with the database, wherein the processor is operable to receive at least one microgrid input, wherein the processor is operable to determine a first plurality of optimal power characteristic levels corresponding to the microgrid in response to the at least one microgrid input, wherein each of the first plurality of optimal power characteristic levels is determined at a corresponding one of a plurality of first time intervals for a first time period, wherein the processor is operable to determine a second plurality of optimal power characteristic levels of the device in response to the at least one microgrid input, wherein each of the second plurality of optimal power characteristic levels is determined at a corresponding one of a plurality of second time intervals for a second time period, wherein the plurality of first time intervals is found at a first frequency different than a second frequency of the plurality of second time intervals, and the first time period is different than the second time period, wherein one of the second plurality of optimal power characteristic levels corresponds to one of the first plurality of optimal power characteristic levels at each of the plurality of first time intervals, wherein the processor is configured to control the optimal power characteristic level of the device in response to at least one of the second plurality of optimal power characteristic levels; and
wherein the processor is operable to determine each of the first plurality of optimal power characteristic levels in response to respective ones of the first plurality of optimal power characteristic levels at preceding ones of the plurality of first time intervals, and the processor is operable to determine each of the second plurality of optimal power characteristic levels in response to respective ones of the second plurality of optimal power characteristic levels at preceding ones of the plurality of second time intervals.

2. The controller as recited in claim 1, wherein the device is one of an energy storage device or a generator.

3. The controller as recited in claim 1, wherein the first frequency is greater than the second frequency.

4. The controller as recited in claim 3, wherein the first frequency is between ten minutes and fifteen minutes and the second frequency is between 120 seconds and 180 seconds.

5. The controller as recited in claim 1, wherein the at least one microgrid input is a load forecast corresponding to the device.

6. The controller as recited in claim 1, wherein the at least one microgrid input is a utility cost associated with the device.

7. The controller as recited in claim 1, wherein only an earliest of the second plurality of optimal power characteristic levels is communicated to the device.

8. A system for power distribution comprising:
a main electric grid in communication with a power source;
a microgrid in communication with the main electric grid, the microgrid including a controller comprising a processor;
a device of the microgrid operable to communicate with the controller, wherein the processor is operable to determine an optimal power characteristic level of the device, wherein the processor is operable to receive at least one microgrid input, wherein the processor is operable to determine a first plurality of optimal power characteristic levels corresponding to the microgrid in response to the at least one microgrid input, wherein each of the first plurality of optimal power characteristic levels is determined at a corresponding one of a plurality of first time intervals for a first time period, wherein the processor is operable to determine a second plurality of optimal power characteristic levels of the device in response to the at least one microgrid input, wherein each of the second plurality of optimal power characteristic levels is determined at a corresponding one of a plurality of second time intervals for a second time period, wherein the plurality of first time intervals is found at a first frequency different than a second frequency of the plurality of second time intervals, and the first time period is different than the second time period, wherein one of the second plurality of optimal power characteristic levels corresponds to one of the first plurality of optimal power characteristic levels at each of the plurality of first time intervals, wherein the processor controls the optimal power characteristic level of the device in response to at least one of the second plurality of optimal power characteristic levels; and
wherein the processor is operable to determine each of the first plurality of optimal power characteristic levels in response to respective ones of the first plurality of optimal power characteristic levels at preceding ones of the plurality of first time intervals, and the processor is operable to determine each of the second plurality of optimal power characteristic levels in response to respective ones of the second plurality of optimal power characteristic levels at preceding ones of the plurality of second time intervals.

9. The system as recited in claim 8, wherein the controller includes a forecast module operable to communicate the at least one microgrid input to the processor, wherein the at least one microgrid input is a load forecast for the device.

10. The system as recited in claim 8, wherein the controller includes a server operable to provide the at least one microgrid input to the processor, wherein the at least one microgrid input is real time utility cost for the device.

11. The system as recited in claim 8, wherein the controller is operable to communicate only an earliest of the second plurality of optimal power characteristic levels to the device.

12. The system as recited in claim 8, wherein the at least one microgrid input is a status of the device, wherein the device communicates the status to the controller, and is operable to receive the optimal power characteristic level from the controller.

13. The system as recited in claim 8, wherein at least one of the second plurality of optimal power characteristic levels is less than at least one of the first plurality of optimal power characteristic levels.

14. The system as recited in claim 9, wherein the load forecast includes an individual load forecast for the device and includes a microgrid load forecast for the at least one microgrid, and wherein the individual load forecast differs from the microgrid load forecast.

15. The method as recited in claim 11, wherein the processor is operable to change the optimal power characteristic level of the device to match the earliest one of the second plurality of optimal power characteristic levels in response to a command from the controller.

16. A method of power distribution for a power grid, comprising:

operating a device of a microgrid having a power characteristic level;

providing at least one input to a microgrid controller;

determining a first plurality of optimal power characteristic levels corresponding to the microgrid using the microgrid controller in response to the at least one input, wherein each of the first plurality of optimal power characteristic levels is determined at a corresponding one of a plurality of first time intervals for a first time period;

determining a second plurality of optimal power characteristic levels of the device using the microgrid controller in response to the at least one input of the microgrid controller, wherein each of the second plurality of optimal power characteristic levels is determined at a corresponding one of a plurality of second time intervals for a second time period, wherein the plurality of first time intervals is found at a first frequency different than a second frequency of the plurality of second time intervals, and wherein the first time period is different than the second time period, wherein one of the second plurality of optimal power characteristic level corresponds to one of the first plurality of optimal power characteristic levels at each of the plurality of first time intervals;

communicating an earliest one of the second plurality of optimal power characteristic levels to the device;

changing the optimal power characteristic level of the device to match the earliest one of the second plurality of optimal power characteristic levels in response to a command from the microgrid controller; and wherein the determining step includes determining each of the first plurality of optimal power characteristic levels in response to respective ones of the first plurality of optimal power characteristic levels at preceding ones of the plurality of first time intervals, and includes determining each of the second plurality of optimal power characteristic levels in response to respective ones of the second plurality of optimal power characteristic levels at preceding ones of the plurality of second time intervals.

17. The method as recited in claim 16, wherein only the earliest one of the second plurality of optimal power characteristic levels is communicated to the device.

18. The method as recited in claim 16, including the step of determining a load forecast of the device using a forecast module, wherein the at least one input is the load forecast.

19. The method as recited in claim 16, including the step of determining a real time utility cost of the device using a server, wherein the at least one input is the real time utility cost.

20. The method as recited in claim 16, wherein the first frequency is fifteen minutes and the second frequency is ninety seconds.

21. The method as recited in claim 16, including the step of communicating a status of the device to the microgrid controller.

22. The method as recited in claim 16, wherein the device is a battery or a generator assembly.

* * * * *